(12) United States Patent
Burrell

(10) Patent No.: US 7,389,344 B2
(45) Date of Patent: Jun. 17, 2008

(54) METHODS AND APPARATUS FOR UTILIZING SCRIPTS TO INTERACT WITH ELECTRONIC INFORMATION PAGES OF REMOTE DEVICES

(75) Inventor: Brandon Burrell, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 656 days.

(21) Appl. No.: 10/283,780

(22) Filed: Oct. 30, 2002

(65) Prior Publication Data

US 2004/0088368 A1   May 6, 2004

(51) Int. Cl.
*G06F 15/173* (2006.01)

(52) U.S. Cl. ..................................... 709/224

(58) Field of Classification Search ........ 709/217–219, 709/220–222, 203, 224
See application file for complete search history.

(56) References Cited

U.S. PATENT DOCUMENTS

| | | | | |
|---|---|---|---|---|
| 5,063,523 A * | 11/1991 | Vrenjak | | 709/224 |
| 5,790,977 A * | 8/1998 | Ezekiel | | 709/229 |
| 5,887,139 A * | 3/1999 | Madison et al. | | 709/223 |
| 6,112,246 A * | 8/2000 | Horbal et al. | | 709/230 |
| 6,195,689 B1 * | 2/2001 | Bahlmann | | 709/217 |
| 6,199,098 B1 * | 3/2001 | Jones et al. | | 709/203 |
| 6,446,192 B1 * | 9/2002 | Narasimhan et al. | | 709/203 |
| 6,636,983 B1 * | 10/2003 | Levi | | 709/224 |
| 6,664,988 B1 * | 12/2003 | Rollins | | 715/853 |
| 6,671,745 B1 * | 12/2003 | Mathur et al. | | 709/223 |
| 2003/0179227 A1 * | 9/2003 | Ahmad et al. | | 345/736 |
| 2003/0198188 A1 * | 10/2003 | Castlebury et al. | | 370/252 |

* cited by examiner

*Primary Examiner*—Nathan Flynn
*Assistant Examiner*—J. Bret Dennison
(74) *Attorney, Agent, or Firm*—Hope Baldauff Hartman, LLC

(57) ABSTRACT

Methods and systems utilize one or more scripts to enable interaction with an electronic information page of a remote device. The electronic information page contains operating data for the remote device, and the operating data may be a measured parameter or a control setting. The remote device may provide a web server application through which the electronic information page, such as a static web page, may be accessed. The at least one script provides location information for the electronic information page and operating data within the page. The at least one script may provide an alias name or group for the remote device(s) that specifies a uniform resource locator address where the electronic information page(s) may be found. The at least one script may also provide commands that include the path(s) to the electronic information page and the variable name(s) for the operating data to be obtained and/or set. A utility application may receive user input through the command line of a computer, such as receiving a product name and URL or an alias name, as well as a command to cause the utility to interact with the appropriate electronic information page on the network.

19 Claims, 8 Drawing Sheets

// Alias Definitions

ALIAS = DEFAULT  — 502
    LOCATION = 111.222.333.444 — 504
506 —  DEVICENAME = MRG2

ALIASGROUP = ALLG2S — 508
        SUBALIAS = AMIG2 — 510
        SUBALIAS = AMINAS — 512

514 — ALIAS = AMIG2
    LOCATION = 111.222.333.444 — 516
518 —  DEVICENAME = MRG2

520 — ALIAS = AMINAS
    LOCATION = 111.222.333.444 — 522
    DEVICENAME = NASDEV — 524

*Fig. 5*

// Command Definitions

DEVICENAME = MRG2 —————602

COMMAND GROUP = VOLTAGES —————604
        DESCRIPTION = " \t Test Voltage \n" —————606
608————— PRINTBEFORE = "Product \t Location \t Value \n"
        SUBCOMMAND = VOLTAGE233 —————610
        SUBCOMMAND = VOLTAGEPCI12V —————612
ENDOFCOMMAND —————614

// Begin Derived Commands
COMMAND = VOLTAGE233 —————616
    PRINTFORMAT = "MegaracG23.3V" —————618
    UPPERLIMIT = 3400   // in millivolts —————620
622————— LOWERLIMIT = 3200
    VARNAME = "var_g233v" —————624
626————— COMMAND = VOLTAGEPCI12V
    DESCRIPTION = " \t Table voltage display \n" —————628
    PRINTBEFORE = "% P \t%U \t" —————630
    PRINTFORMAT = "PCI   12V"
632————— PRINTAFTER = " \t %.2f \t %T \t %B \n" —————634
    UPPERLIMIT = 13000 —————636
638————— LOWERLIMIT = 11000
    CONVERTTYPE = DIVIDEBY —————640
642————— CONVERTUNIT = 1000
    VARNAME = "var_pci12v" —————644
646————— VARTYPE = VALUE
    PATH = \health-volt.asp —————648
650————— ENDOFCOMMAND

*Fig. 6*

```
<html>
<body>

<var_g233v = 3250>      ← 702

<var_pci12v = 14000>  ←
                        704
</body>
</html>
```

*Fig. 7*

METHODS AND APPARATUS FOR UTILIZING SCRIPTS TO INTERACT WITH ELECTRONIC INFORMATION PAGES OF REMOTE DEVICES

TECHNICAL FIELD

The present invention relates to obtaining operating information of a remote device. More particularly, the present invention relates to utilizing scripts to interact with electronic information pages of the remote devices that contain the operating information.

BACKGROUND

The operating parameters of various devices must be monitored in many situations in order to maintain the operating parameters and enable proper functionality of the devices. As a general example, a device may operate on or produce various voltages, and those voltages must remain within an acceptable range for the electrical device to function properly. Often, the devices to monitor are numerous and/or are located remotely from the technician. Thus, adequately monitoring the operating parameters of numerous or remote devices can be difficult.

In one particular example, a device may be installed in a computer to monitor the operability of the computer. However, the device itself must operate on a voltage supply that lies within a certain range such as an output of a battery or the voltage supply of an interface of the computer. Therefore, the supply voltage used by the device monitoring the computer must also be monitored to maintain the device's ability to continue monitoring the functionality of the server.

Devices such as those used to monitor a server may be equipped with a web server application interfaced to a network. The network connection for the web server application allows the device to post operating parameters to an electronic information page at a particular network location accessible by computers linked to the network. For example, the web server interface allows a device to post a static hypertext markup language ("HTML") based web page that contains operating parameters and that has a particular uniform resource location ("URL") address on the network. Therefore, a computer linked to the network can access the electronic information page at the network location to obtain or set parameters for the device merely by interacting with the page.

To access the electronic information page of the device, a computer must know the appropriate location of the electronic information page. Furthermore, to find a specific piece of information within the electronic information page, the computer must know the pointer within the electronic information page to the operating data that is to be obtained from or set for the device. With each device possibly having several different operating data entries to monitor and with multiple devices to be monitored, the computer and/or the technician operating it must have access to a significant amount of information to correctly interact with the electronic information page. Furthermore, as new or pre-existing devices are added to the set of devices to monitor, the information the computer needs to locate the devices must be updated to enable connection to the electronic information pages of the added devices. These issues make it difficult for the technician using the computer to effectively interact with the electronic information pages for the devices being monitored.

SUMMARY

Embodiments of the present invention address these and other problems by providing methods and systems that utilize at least one script to specify the location information for the electronic information pages of the devices. A utility takes user input related to the desired interaction with an electronic information page and references the at least one script to find the information necessary to interact with the electronic information page. The at least one script may contain the address of the electronic information page as well as the pointer to the specific piece of data being requested by the user. The at least one script may contain various other associations as well, including groupings of pointers to various pieces of information as well as groupings of devices to enable multiple sets of operating data for one or multiple devices to be obtained. Additionally, the scripts may be modified to accommodate added devices or other new information without the need for compiling any source code.

One embodiment provides a method of obtaining operational data provided by an electronic device linked to a network. The method involves receiving information at a first computer where the information is associated with an address of the electronic device on the network and that is associated with operational data to be obtained. At least one script is accessed to determine an address of the electronic device on the network and a path of an electronic information page at the address based on the received information. The electronic information page of the device provided at the address and path is accessed through the network via a hypertext transfer protocol to obtain the specified operational data from the electronic information page.

Another embodiment is a method of interacting with an electronic information page provided by an electronic device linked to a network with the electronic information page containing operating data for the electronic device. The method involves receiving information through user input at a first computer linked to the network. At least one script that associates a location of the electronic information page on the network with the received information is accessed to obtain the location. Interaction occurs through the network via a hypertext transfer protocol with the electronic information page at the location obtained from the script.

Another embodiment is a method of interacting with at least one electronic information page provided by at least one electronic device linked to a network with the at least one electronic information page containing at least one entry of operating data for the at least one electronic device. The method involves receiving information through user input at a first computer linked to the network. At least one script that associates a location of each of the at least one electronic information pages on the network with the received information is accessed to obtain the location of each of the at least one electronic information pages. Interaction occurs through the network via a hypertext transfer protocol with each of the at least one electronic information pages at each location obtained from the script.

Another embodiment is a computer readable medium comprising data that represents at least one script that contains a plurality of alias names associated with a uniform resource locator and contains a device name. The device name corresponds to a device that provides an electronic information page that contains operating data of the device and that is accessible at the uniform resource locator.

Another embodiment is a computer readable medium comprising data that represents at least one script that contains a plurality of device names with each device name being associated with at least one command. The command contains an association of values to a variable name and a path name. The path name indicates a path at a uniform resource locator address of an electronic information page provided by a device that contains operating data of the device associated with the variable name.

Another embodiment is a system for interacting with an electronic information page. The system includes a network and a device linked to the network. The device has a memory device that stores the electronic information page at a location accessible through the network. A first computer is linked to the network and is configured to receive information through user input, access at least one script that associates a location of the electronic information page on the network with the received information to obtain the location, and interact through the network via a hypertext transfer protocol with the electronic information page at the location obtained from the script.

DESCRIPTION OF THE DRAWINGS

FIG. 5 shows the structure of one embodiment of a first script that includes multiple alias names and an alias group associated with product names and a URL.

FIG. 6 shows the structure of one embodiment of a second script that includes multiple commands and a command group associated with a product name of the first script structure of FIG. 5.

FIG. 7 shows the structure of one embodiment of an HTML based electronic information page provided by the device of FIG. 3.

DETAILED DESCRIPTION

The electronic information pages of devices that contain operating data and that are accessible over a network are accessed by obtaining location information for the electronic information pages from one or more script files. The script files may contain location information such as a URL and a path at the URL to the electronic information page as well as a variable name that points to the operating data of interest for a particular command entered by a user. Utilizing the location information, interaction may occur with the electronic information including getting the operating data for display and/or setting the operating data to a desired value that may be implemented by the device being monitored.

Figure 1:
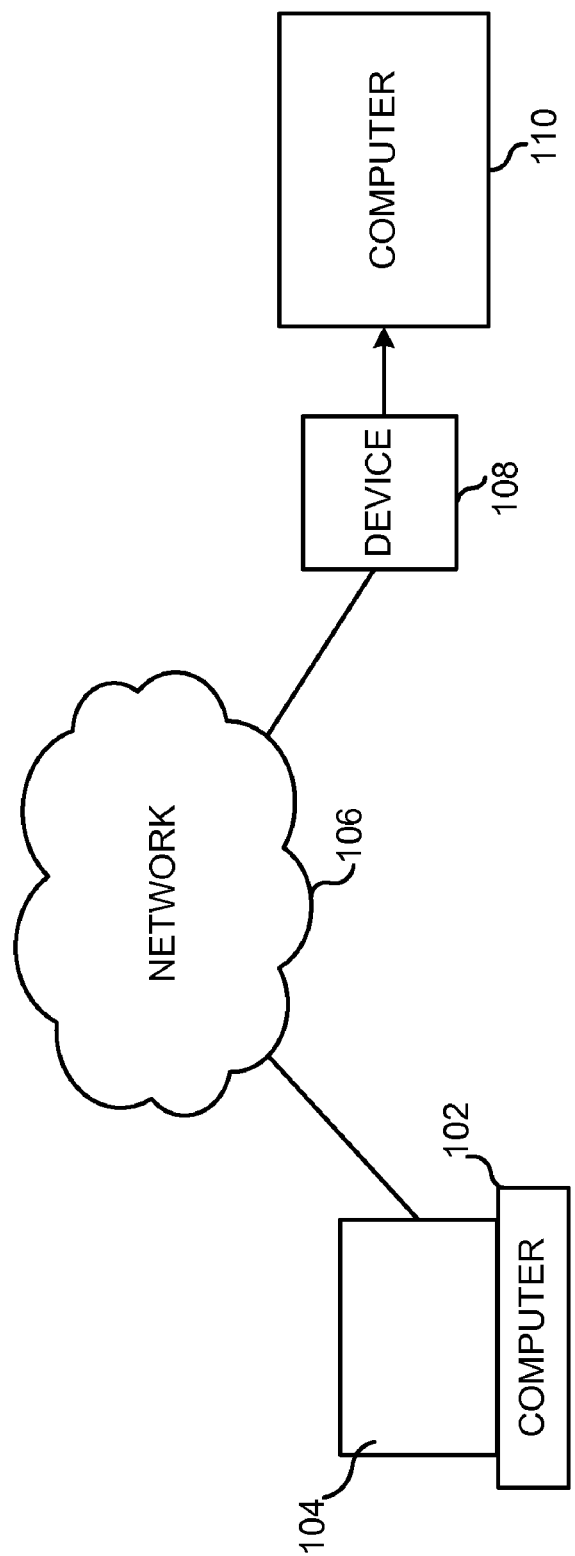
FIG. 1 shows a networked environment including a device monitoring a computer and a computer that interacts with an electronic information page of the device.

FIG. 1 shows an example of an operating environment containing a device 108 to be monitored. The device 108 of this example is linked to a computer 110, and the device 108 monitors the computer 110 to provide information to remote locations over a network, such as but not necessarily network 106. For example, the device 108 may capture display frames of the computer 110 and provides those display frames for display at a remote computer, such as but not necessarily remote computer 102.

The device 108 provides an electronic information page that contains operating data for the device 108. The operating data may be various settings for the device 108 or may be other values such as a voltage being supplied to or output by the device 108. The electronic information page has a network address so that a remote computer 102 can access the electronic information page through the network 106. The remote computer 102 may interact with the electronic information page to get the operating data to display it or otherwise use it for a monitoring purpose. Alternatively, the remote computer 102 may interact with the electronic information page to set the operating data within the electronic information page to control the device 108.

Figure 2:
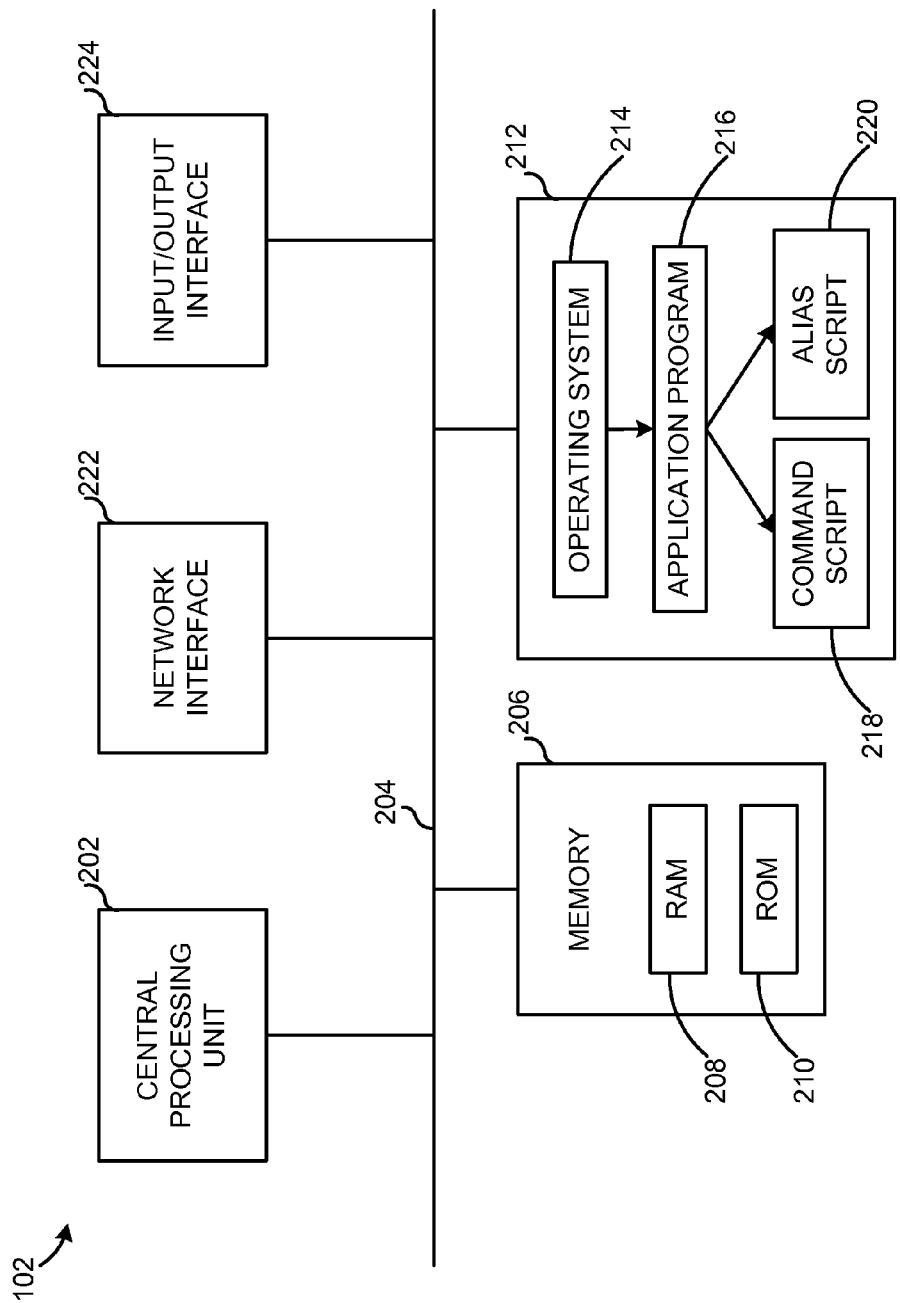
FIG. 2 is a block diagram of the major components of one embodiment of the computer that interacts with the electronic information page of the device.

An example of the major components of the remote computer 102 is shown in FIG. 2. FIG. 2 and the following discussion are intended to provide a brief, general description of a suitable computing environment in which embodiments of the present invention may be implemented. While the present invention will be described in the general context of program modules or applications that execute in conjunction with one or more script files where the applications run on an operating system, those skilled in the art will recognize that the present invention may also be implemented in combination with other program modules and applications.

Generally, program modules and applications include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. Although not necessarily, the invention may also be practiced in distributed computing environments where program modules and applications may be located in various computers of the network rather than in a single remote computer 102.

Turning now to FIG. 2, an illustrative computer architecture for the remote computer 102 for practicing the various embodiments of the invention will be described. The computer architecture shown in FIG. 2 illustrates a conventional computer, including a central processing unit 202 ("CPU"), a system memory 206, including a random access memory 208 ("RAM") and a read-only memory ("ROM") 210, and a system bus 204 that couples the memory to the CPU 202. A basic input/output system containing the basic routines that help to transfer information between elements within the computer, such as during startup, is stored in the ROM 210. The computer 102 further includes a mass storage device 212 for storing an operating system 214, application programs, such as a device interaction application program 216, script files, and data.

The mass storage device 212 is connected to the CPU 202 through a mass storage controller (not shown) connected to the bus 204. The mass storage device 212 and its associated computer-readable media, provide non-volatile storage for the computer 102. Although the description of computer-readable media contained herein refers to a mass storage device, such as a hard disk or CD-ROM drive, it should be appreciated by those skilled in the art that computer-readable media can be any available media that can be accessed by the computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 102 operates in a networked environment as shown in FIG. 1 using logical connections to remote computers and/or the devices 108 through the network 106, such as the Internet or a local area network. The computer 102 may connect to the network 106 through a network interface unit 222 connected to the bus 204. It should be appreciated that the network interface unit 222 may also be utilized to connect to other types of networks and remote computer systems. The computer 102 may also include an input/output controller 224 for receiving and processing input from a number of devices, including a keyboard or mouse (not shown). Similarly, an input/output controller 224 may provide output to a display screen, a printer, or other type of output device.

As mentioned briefly above, a number of program modules, applications, script files, and data may be stored in the mass storage device 212 and RAM 208 of the computer 102, including an operating system 214 suitable for controlling the operation of a networked computer 102. The mass storage device 212 and RAM 208 may also store one or more application programs including the device interaction application program 216 as well as a command script file 218 and alias script file 220. The operation and contents of the device interaction application program 216, command script file 218 and alias script file 220 are discussed in greater detail below with reference to FIGS. 4-6.

Figure 3:
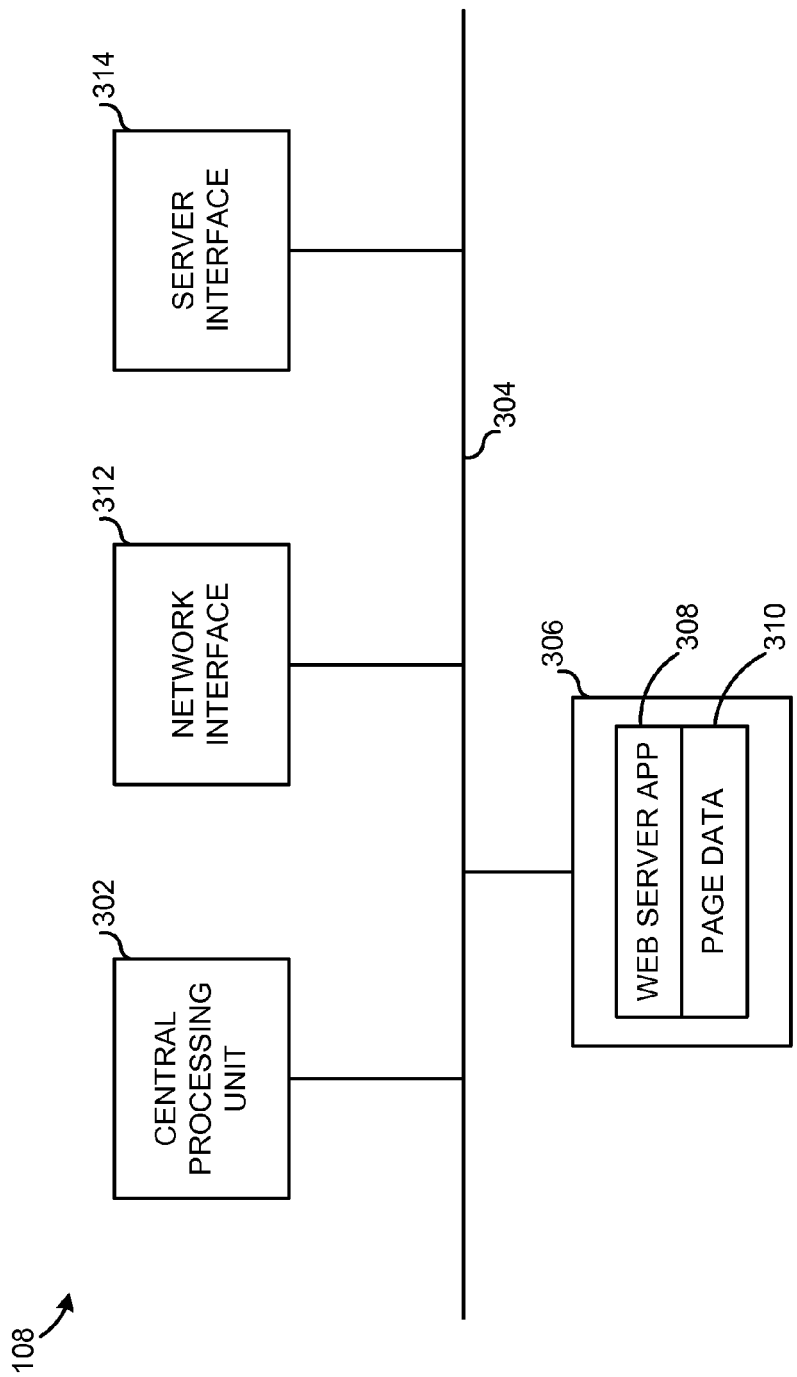
FIG. 3 is a block diagram of the major components of one embodiment of the device that provides the electronic information page that is accessible through the network.

FIG. 3 illustrates the major components of one example of a device 108 that provides the operating data in the electronic information page accessible through the network 106. An illustrative device architecture for the device 108 will be described. The device architecture shown in FIG. 3 includes a CPU 302 and a system memory 306 that may include RAM or ROM or a combination. A system bus 304 couples the memory 306 to the CPU 302. A basic input/output system containing the basic routines that help to transfer information between elements within the device, such as during startup, is stored in the memory 306. The device 108 may also include other information stored in memory 306 such as a web server application 308 and the electronic information page data 310. Alternatively, the web server application 308 and electronic information page data 310 may be stored in a mass storage device (not shown) rather than in system memory 306. The operation and contents of the web server application 308 in conjunction with the electronic page data 310 are discussed in greater detail below with reference to FIG. 7. The CPU 302 may read from and write to the memory 306 to report and/or utilize the page data 310 made accessible to the remote computer 102 through the web server application 308.

According to various embodiments of the invention, the device 108 operates in the networked environment as shown in FIG. 1 using logical connections to remote computers through the network 106, such as the Internet or a local area network. The device 108 may connect to the network 106 through a network interface unit 312 connected to the bus 304. It should be appreciated that the network interface unit 312 may also be utilized to connect to other types of networks and remote computer systems. The device 108 may also include an input/output controller (not shown). The device 108 provides access to the web server application 308 and page data 310 by establishing a network address through the network interface 312 that receives requests for access from the remote computer 102.

The device 108 may also include an interface 314 to the computer 110 that is being monitored. For example, the interface 314 may be a connection to a PCI slot, a USB port, or a video output of the computer 110 to capture video data or other computer health information. Alternatively, the device 108 may be integrated onto the server motherboard or other component interfaced with the server 110.

Figure 4:
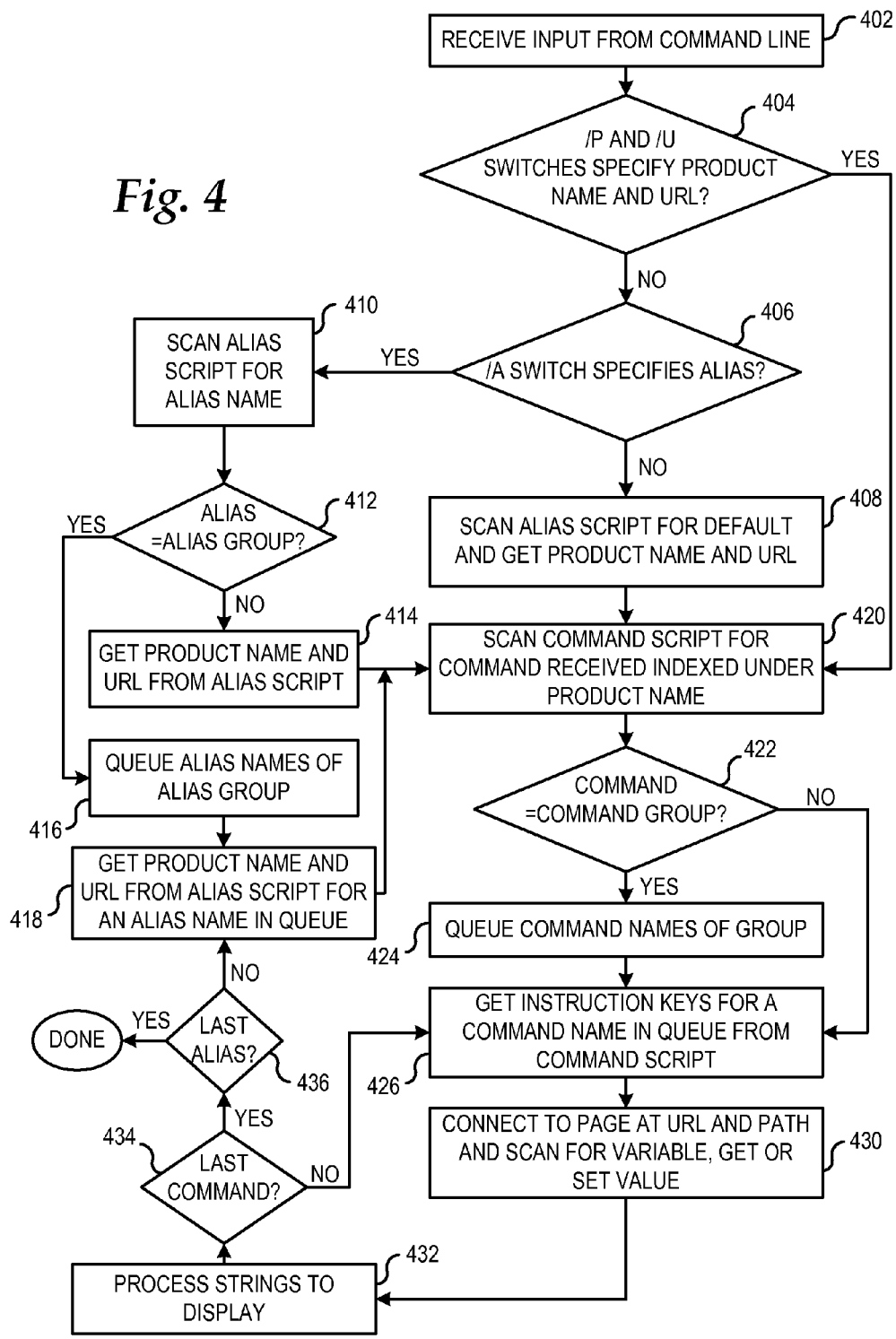
FIG. 4 shows the operational flow of one embodiment of a utility application of the computer that utilizes scripts to establish interaction with the electronic information page.
Figure 8:
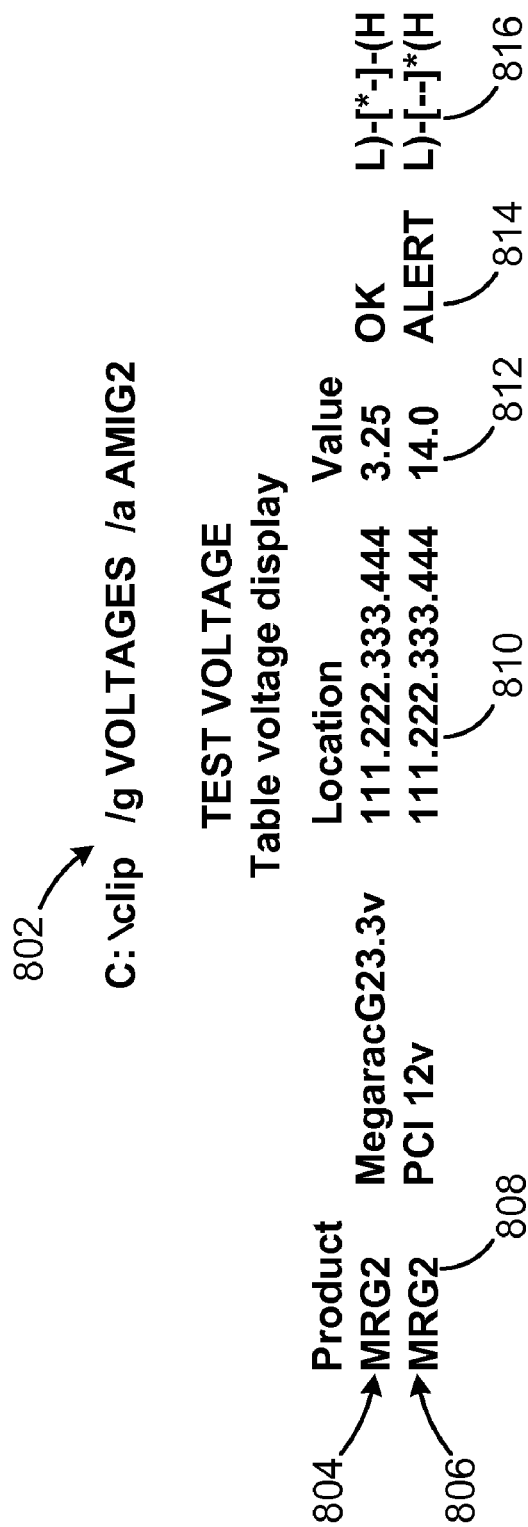
FIG. 8 shows an example of command line user input and a resulting display that occurs through utilization of an application of the computer of FIG. 2 in conjunction with the scripts of FIGS. 5 and 6 to access the electronic information page of FIG. 7.

FIG. 4 shows the logical operations of one embodiment of the device interaction application program 216 and its utilization of the command script 218 and alias script 220. The device interaction application program 216 uses the scripts 218, 220 to interact with the electronic information page established by the web server application 308 and page data 310 of the device 108. The logical operations begin at receive operation 402 where the user provides input to the command line provided by the operating system 214 of the remote computer 102. The user input may include a name of an executable file that forms the application program 216 and that invokes the application program to establish device interaction. The user input may be followed by various switches to provide the application program with the particular device to interact with and the type of interaction that should occur. For example, the user input may include an alias name for a device 108 and a command to get a particular set of voltage readings of the device 108. Such an example is shown at line 802 of FIG. 8 where "clip" invokes the application program 216, the switch "/g" indicates data should be obtained from the page, "VOLTAGES" provides a command to execute to get the desired data, the switch "/a" signals that an alias is being used, and "AMIG2" indicates that the device of interest is known by the alias AMIG2.

It will be appreciated that in other embodiments, information may be input in other forms rather than entering information directly onto the command line. For example, the application program 216 may provide a graphical user interface for entering information that specifies the device to interact with and the type of interaction that should occur. Furthermore, graphical options may be provided for selection to configure the interaction rather than receiving input through text-based switches.

After receiving the user input, it is parsed and query operation 404 detects whether "/p" and "/u" switches have been included in the user input. If so, then the entry after the "/p" indicates the particular product name for the device to interact with, and "/u" indicates the URL where the electronic information page of the device may be found. Use of these switches requires that the user already knows the product name and the URL for that device. If these switches are found, then operational flow proceeds to scan operation 420 discussed below. If these switches are not found, then operational flow proceeds to query operation 406.

At query operation 406, it is detected whether the "/a" switch has been included in the user input to indicate an alias name is being provided. If not, then operational flow proceeds to scan operation 408 where the alias script file 220 is scanned to find the default alias entry that specifies the default product name and the default URL. Operational flow proceeds to scan operation 420 discussed below once the defaults are obtained. If the "/a" switch has been provided, then operational flow proceeds to scan operation 410.

At scan operation 410, the alias script 220 is scanned to find the alias name provided with the alias switch on the command line. The structure of the alias script 220 is discussed in more detail below with reference to FIG. 5. Once the alias name is found in the alias script 220, query operation 412 detects from the alias script 220 whether the alias corresponds to an alias group. If not, then the alias corresponds to an alias name of a single product and the product name and URL for the alias are obtained at get operation 414. Operational flow then proceeds to scan operation 420.

If the alias corresponds to an alias group, then the alias names of the group are obtained from the alias script 220 and queued at queue operation 416. Then, for the first iteration, the first alias name in the queue is referenced in the alias script 220 to find the product name and URL for the alias name at get operation 418. Operational flow then proceeds to scan operation 420.

Once operational flow has reached scan operation 420 through one of the various paths discussed above, the command script file 218 is scanned to find the command entered by the user that is indexed in the command script file 218 under the product name that has been previously obtained. The structure of the command script file 218 is discussed in more detail below with reference to FIG. 6. Once the command has been found, query operation 422 detects whether the command is a command group. If not, then the instruction keys for the command are obtained from the command script 218 at get operation 426. Among other things, the instruction keys provide the path to the electronic information page and the variable within the page that points to the operating data of interest for the command. The instruction keys are also discussed in more detail below with reference to FIG. 6. Operational flow then proceeds to connect operation 430 after the instruction keys have been obtained.

If query operation 422 detects that the command is a command group, then the command names for the command group are obtained from the command script 218 and queued at queue operation 424. The instruction keys for the first command in the queue, for the first iteration, are obtained from the command script 218 at get operation 426. Operational flow then proceeds to connect operation 430.

At connect operation 430, the application program 216 causes the remote computer 102 to establish a connection over the network 106 with the electronic information page of the device 108 at the URL and path previously obtained. Additionally, the electronic information page is scanned for the variable previously obtained for a command and interaction then occurs by the application program 216 getting data from the page or setting data within the page.

If the user input at the command line specified a get operation, then operational flow proceeds to process operation 432 where the strings of the instruction keys for a command are processed to produce a display to the user. An example of the display to the user is discussed in more detail below with reference to FIG. 8. These strings are discussed in more detail below with reference to FIG. 6, and examples include display formatting and unit conversions for the obtained data. Operational flow then proceeds to query operation 434. If the user input at the command line specified a set operation, then operational flow proceeds directly to the query operation 434.

At query operation 434, it is detected whether the command that just completed was the last command in the queue. If not, then operational flow returns to get operation 426 where the next command in the queue is referenced in the command script 218 to obtain the relevant instruction keys. If the command just completed was the last command, then operational flow transitions to query operation 436.

At query operation 436, it is detected whether the alias whose commands have just completed processing is the last alias in the queue. If not, then operational flow returns to get operation 418 where the next alias in the queue is referenced in the alias script 220 to obtain the product name and URL. If the alias that just completed processing is the last alias, then the application program 216 stops.

FIG. 5 shows an example of the alias script file 220. The alias script file contains an entry 502 that provides a default alias heading. Entry 504 is grouped with the default alias heading and provides a URL specifying the location of the electronic information page. Entry 506 is grouped with the default alias heading and provides a product name that can be referenced in the command script 218 to find the set of commands for the device.

Entry 508 provides one alias group heading. Entry 510 is grouped with the alias group heading 508 and provides a first alias name of the alias group. Entry 512 is grouped with the alias group heading 508 and provides a second alias name of the alias group.

Entries 514 and 520 provide alias name headings. Entries 516 and 522 are grouped with the alias name headings 514 and 520, respectively, and provide a URL specifying the location of the electronic information pages. Entries 518 and 524 are grouped with the alias name headings 514 and 520, respectively, and provide product names for the alias names that can be referenced in the command script 218.

FIG. 6 shows an example of the command script file 218. The command script file 218 contains an entry 602 that provides a product name heading that corresponds to a product name contained in the alias script file 220. Entry 604 is a command group heading grouped under the product name heading of entry 602. Entry 606 grouped under the command group heading of entry 604 specifies descriptive information regarding the function of the command. Entry 608 grouped under the command group heading of entry 604 specifies additional information to be displayed by the application program to set up columns of a table to display data obtained from the electronic information page. Entries 610 and 612 grouped under the command group heading of entry 604 set forth subcommands that are command names also contained in the command script file 218 and that form the command group. Entry 614 signifies the end of the command group.

The command script 218 of FIG. 6 also contains a derived commands section that contains several commands that may or may not correspond to some or all of the commands of the command group discussed above. In the example shown, the derived commands section contains two commands that are defined as subcommands for the command group, but these two may also be used as single commands independent of whether they are part of another command group. Entry 616 provides a command heading for the first command, while entry 618 specifies information to be displayed for this particular command to define the operating parameter corresponding to the displayed value. Entries 620 and 622 specify upper and lower limits to the acceptable range for the operating parameter whose value is being obtained. As discussed below, the application program may process strings such as a comparison of the operating data to the acceptable range to provide an alert and/or a graph of the parameter relative to the acceptable range. Entry 624 specifies the variable that points to the operating data of interest within the electronic information page of the remote device.

The command starting at entry 616 and proceeding through entry 624 lacks several script entries that may be used to obtain or set and display the operating data, such as the particular path at the URL. However, the application program may operate upon derived commands such as the command of entry 624 by processing script entries grouped below a subsequent command heading but prior to the end of command entry 650 where these subsequent entries apply equally to multiple commands. In the example shown, the additional script entries are grouped below the command heading of entry 626 that is within the same derived command section and is above the end of command entry 650.

Entry 628 grouped below the command heading of entry 626 specifies additional information to be displayed upon interacting with the remote device to describe the type of operating data being displayed. Entry 630 specifies information to print ahead of the obtained operating data, such as the product name and the URL for the device. It should be noted that escape codes such as "/t" and "/n" may used. In the example shown, "/t" signifies a tab for the display while "/n" signifies a new line. The application program may be configured to recognize such escape codes in the alias and command scripts and perform the associated task. Furthermore, others may be used as well such as "%P" to indicate the product name obtained from the command line or alias script 220 and "%U" to indicate the URL.

Entry 632 specifies additional information to display to label the obtained operating data for the command heading 626. Entry 634 provides the display format for the obtained data where "%0.2f" indicates that the obtained data should be displayed to two decimal points as a floating point number. "%T" indicates a status message should be displayed based upon a comparison of the operating data to the acceptable range, and "%B" indicates that a graph of the operating parameter relative to the acceptable range should be displayed.

Entries 636 and 638 specify the acceptable range for the operating data of command heading 626. Entry 640 specifies that the arithmetic for conversion should be a division operation while entry 642 indicates that the conversion factor for this example is 1000, such as to convert data representing millivolts to data representing volts for display. Entry 644 specifies the variable name pointing to the operating data of interest within the electronic information page of the device for the command heading 626. Entry 646 specifies that the type of data being obtained from the electronic information page that is associated with the previously specified variable is a value rather than a string. Entry 648 specifies the path at the URL taken from the alias script 220 to the electronic information page of the device. Entry 650 specifies the end of command for the derived command section.

The alias script file 220 of FIG. 5 and the command script file of FIG. 6 illustrate that the information used by the application program to access the proper electronic information page is text based. Therefore, the scripts may be easily modified using a text editor when a new device to be accessed is added, when a new operating parameter for a device being monitored is added, or when a device or parameter should no longer be accessed. Furthermore, these scripts can abstract the network location, display formatting information, and device type from the user so that the user need only be concerned with the particular command to be used as input to the application.

FIG. 7 shows an example of the structure of the electronic information page provided to make the operating data accessible. This example provides an HTML based source code page that contains two operating data entries. The first entry 702 provides operating data that is a value for the variable specified in the command script 218 for the command heading 616 for the given variable name in 624. The second entry 704 provides operating data that is a value for the variable specified in the command script 218 for command heading 626 for the given variable name in 644. Thus, upon receiving the information from the user at the command line and then accessing the script files accordingly, the application program accesses the variable(s) of interest in the electronic information page to obtain or set the operating data.

As discussed above, FIG. 8 shows an example of a screen display including the command line 802 and received user input and the resulting display of obtained operating data for a device 108. The display includes a row 804 of information providing the product name 808, the URL 810, the obtained value 812 after the conversion for printing/displaying, the status 814 relative to the acceptable range (i.e., OK vs. ALERT), and the bar graph 816 showing the obtained value relative to the acceptable range. The operating data is represented as an asterisk within the bar graph and the acceptable range is defined by open and closed brackets. From this display, the user can quickly see whether an operating parameter of a particular remote device is acceptable.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of obtaining operational data provided by an electronic device linked to a network, comprising:

receiving, at a computer located remotely from the electronic device, information input by a user, wherein the information includes an alias name for the electronic device and a command indicating a type of operational data associated with the electronic device to be obtained;

scanning an alias script file stored on the computer for the alias name, the alias script file including the alias name, a product name corresponding to the alias name, and an address where an electronic information page of the electronic device is located;

once the alias name is found in the alias script file, scanning a command script file stored on the computer for the command indexed by the product name obtained from the alias script file, the command script file including a path at the address obtained from the alias script file to the electronic information page provided by the electronic device, a variable name within the electronic information page that points to the operational data to be obtained, and strings indicating how to provide the operational data;

accessing through the network via a hypertext transfer protocol the electronic information page of the electronic device provided at the address obtained from the alias script file and the path obtained from the command script file, the electronic information page including a plurality of operational data entries;

scanning the electronic information page for the variable name obtained from the command script file;

obtaining the operational data corresponding to the variable name from the electronic information page obtaining the strings from the command script file, the strings including display formatting for the operational data, unit conversions for the operational data, and an acceptable range for comparing with the operational data;

converting the operational data obtained from the electronic information page based on the unit conversions from the strings of the command script file;

comparing the operational data obtained from the electronic information page with the acceptable range from the command script file to determine whether the operational data is within the acceptable range; and providing, at the computer, a display including the operational data obtained from the electronic information page and converted based on the unit conversions, an alert indicating whether the operational data is within the acceptable range, and a graph illustrating the acceptable range and the operational data relative to the acceptable range, the display provided based on the display formatting from the strings of the command script file.

2. The method of claim 1, wherein converting the operational data from the electronic information page based on the unit conversions from the strings of the command script file comprises applying a mathematical conversion to the operational data.

3. The method of claim 1, wherein receiving information input by a user comprises receiving typed input through a command line provided by an operating system running on the computer.

4. The method of claim 1, wherein the electronic device implements a web server application to provide the electronic information page at the address.

5. A computer-readable storage medium containing instructions for performing a method of interacting with an electronic information page provided by a first electronic device linked to a network, the method comprising:

receiving user input at a computer linked to the network, wherein the input includes an alias name for the first electronic device and a command indicating a type of operational data to be obtained from the electronic information page provided by the first electronic device;

scanning an alias script file stored on the computer for the alias name, the alias script file including the alias name, a product name corresponding to the alias name, and an address where the electronic information page of the first electronic device is located;

once the alias name is found in the alias script file, scanning a command script file stored on the computer for the command indexed by the product name obtained from the alias script file, the command script file including a path at the address obtained from the alias script file to the electronic information page provided by the first electronic device, a variable name within the electronic information page that points to the operational data to be obtained, and strings indicating how to provide the operation data;

accessing through the network the electronic information page provided by the first electronic device at the address obtained from the alias script file and the path obtained from the command script file, the electronic information page including a plurality of operational data entries;

scanning the electronic information page for the variable name command script file;

obtaining the operational data corresponding to the variable name from the electronic information page provided by the first electronic device;

obtaining the strings from the command script file, the strings including display formatting for the operational data, unit conversions for the operational data, and an acceptable range for comparing with the operational data;

converting the operational data obtained from the electronic information page based on the unit conversions from the strings of the command script file;

comparing the operational data obtained from the electronic information page with the acceptable range from the command script file to determine whether the operational data is within the acceptable range; and providing, at the computer, a display including the operational data obtained from the electronic information page and converted based on the unit conversions, an alert indicating whether the operational data is within the acceptable range, and a graph illustrating the acceptable range and the operational data relative to the acceptable range, the display provided based on the display formatting from the strings of the command script file.

6. The computer-readable storage medium of claim 5, wherein the address comprises a uniform resource locator address.

7. The computer-readable storage medium of claim 5, wherein the received input includes a switch indicating that the operational data of the first electronic device should be obtained.

8. The computer-readable storage medium of claim 5, wherein the received input further includes a switch indicating that operational data of the first electronic device should be set, and the method further comprising setting the obtained operational data.

9. The computer-readable storage medium of claim 5, further comprising:

editing the text of the alias script file to create an association between a location of an electronic information page on the network provided by a second electronic device;

receiving further user input at the computer linked to the network, wherein the further input includes an alias name for the second electronic device and a command indicating a type of operational data associated with the second electronic device to be obtained;

scanning the alias script file stored on the computer for the alias name for the second electronic device, the alias script file including the alias name for the second electronic device, a product name corresponding to the alias name for the second electronic device, and an address where the electronic information page of the second electronic device is located; and interacting through the network via a hypertext transfer protocol with the electronic information page provided by the second electronic device at the address obtained from the alias script file.

10. A method of interacting with at least one electronic information page provided by at least one electronic device linked to a network, the method comprising:

receiving information through user input at a computer linked to the network, wherein the information includes a product name for the at least one electronic device, an address where the at least one electronic information page provided by the at least one electronic device is located, and a command indicating a type of operational data associated with the at least one electronic device to be obtained from the at least one electronic information page;

scanning a command script file stored on the computer for the command indexed by the product name, the command script file including a path at the address to the at least one electronic information page provided by the at least one electronic device, a variable name within the at least one electronic information page that points to the operational data to be obtained, and strings indicating how to provide the operational data;

accessing through the network via a hypertext transfer protocol the at least one electronic information page at the address included in the received information and the path obtained from the command script file, the at least one electronic information page including a plurality of data entries;

scanning the at least one electronic information page for the variable name obtained from the command script file;

obtaining the operational data corresponding to the variable name from the at least one electronic information page;

obtaining the strings from the command script file, the strings including display formatting for the operational data, unit conversions for the operational data, and an acceptable range for comparing with the operational data;

converting the operational data obtained from the at least one electronic information page based on the unit conversions from the strings of the command script file;

comparing the operational data obtained from the at least one electronic information page with the acceptable range from the command script file to determine whether the operational data is within the acceptable range; and providing, at the computer, a display including the operational data obtained from the at least one electronic information page and converted based on the unit conversions, an alert indicating whether the operational data is within the acceptable range, and a graph illustrating the acceptable range and the operational data relative to the acceptable range, the display provided based on the display formatting from the strings of the command script file.

11. The method of claim 10, wherein the received information further includes a switch indicating whether the operational data is to be obtained or set.

12. The method of claim 10, wherein the command is a command group and the command script file contains a group of commands indexed by the command group, wherein each command of the group of commands contains a variable name, and wherein one command of the group contains a path and display information applicable to execution of each of the commands of the command group.

13. A computer storage media comprising data that represents:

a first script that contains at least one alias name, the at least one alias name associated with a uniform resource locator and a device name, wherein the device name corresponds to a device that provides an electronic information page that contains operating data associated with the device, and wherein the electronic information page provided by the device is accessible at the uniform resource locator; and a second script that contains the device name associated with the at least one alias name from the first script, at least one command associated with the device name, a path at the uniform resource locator from the first script to the electronic information page provided by the device, a variable name within the electronic information page that points to operating data within the electronic information page associated with the at least one command, and strings indicating how to provide the operating data associated with the variable name, wherein the computer storage media comprising the first and second scripts is included on a computer in communication over a network with the device, wherein the computer scans the electronic information page provided by the device for the variable name from the second script to obtain the operating data associated with the variable name, wherein the computer obtains the strings from the second script, the strings including display formatting for the operating data, unit conversions for the operating data, and an acceptable range for comparing with the operating data, wherein the computer converts the operating data obtained from the electronic information page based on the unit conversions from the strings of the second script;

wherein the computer compares the operating data obtained from the electronic information page with the acceptable range from the second script to determine whether the operating data is within the acceptable range; and wherein the computer provides a display including the operating data obtained from the electronic information page and converted based on the unit conversions, an alert indicating whether the operating data is within the acceptable range, and a graph illustrating the acceptable range and the operating data relative to the acceptable range, the display provided based on the display formatting from the strings of the second.

14. The computer storage media of claim 13, wherein the first script contains at least one alias group associated with a plurality of subalias names, and wherein the subalias names are associated with the plurality of alias names.

15. The computer storage media of claim 13, wherein the at least one command is further associated with a command group, and wherein the command group is associated with a plurality of subcommands.

16. The computer storage media of claim 15, wherein each of the plurality of subcommands is associated with a variable name, and wherein one of the plurality of subcommands is associated with display instructions and a path to the electronic information page containing the variable name associated with each of the plurality of subcommands.

17. A system for interacting with an electronic information page, the system comprising:

a network;

a device linked to the network, the device having a memory device that stores the electronic information page at a location accessible through the network; and a computer linked to the network including an alias script file and a command script file, the computer being configured to:

receive information input by a user, wherein the information includes an alias name for the device and a command indicating a type of operational data to be obtained from the electronic information page stored on the device, scan the alias script file for the alias name, the alias script file including the alias name, a product name corresponding to the alias name, and an address where the electronic information page of the device is located, once the alias name is found in the alias script file, scan the command script file for the command indexed by the product name obtained from the alias script file, the command script file including a path at the address obtained from the alias script file to the electronic information page on the network, a variable name within the electronic information page that points to the operational data identified by the received information to be obtained, and strings indicating how to provide the operational data, access through the network via a hypertext transfer protocol the electronic information page at the address obtained from the alias script file and the path obtained from the command script file, the electronic information page including a plurality of operational data entries, scan the electronic information page for the variable name obtained from the command script file, obtain the operational data corresponding to the variable name from the electronic information page provided by the device, obtain the strings from the command script file, the strings including display formatting for the operational data, unit conversions for the operational data, and an acceptable range for comparing with the operational data, convert the operational data obtained from the electronic information page based on the unit conversions from the strings of the command script file, compare the operational data obtained from the electronic information page with the acceptable range from the command script file to determine whether the operational data is within the acceptable range, and provide a display including the operational data obtained from the electronic information page and converted based on the unit conversions, an alert indicating whether the operational data is within the acceptable range, and a graph illustrating the acceptable range and the operational data relative to the acceptable range, the display provided based on the display formatting from the strings of the command script file.

18. The system of claim 17, wherein the computer is further configured to run an operating system that provides a command line, and wherein the information input by the user is entered through the command line.

19. The system of claim 17, wherein the received information specifies whether to get the operational data from the electronic information page or set the operational data within the electronic information page.

* * * * *

UNITED STATES PATENT AND TRADEMARK OFFICE
CERTIFICATE OF CORRECTION

PATENT NO.       : 7,389,344 B2
APPLICATION NO.  : 10/283780
DATED            : June 17, 2008
INVENTOR(S)      : Brandon Burrell It is certified that error appears in the above-identified patent and that said Letters Patent is hereby corrected as shown below:

Column 11, lines 7-8

Insert a semi-colon -- ; -- after the word 'page':

obtaining the operational data corresponding to the variable
    name from the electronic information page;

Signed and Sealed this

Seventh Day of October, 2008

JON W. DUDAS
*Director of the United States Patent and Trademark Office*